United States Patent [19]

Sharps, Jr.

[11] Patent Number: 4,522,675
[45] Date of Patent: Jun. 11, 1985

[54] METHOD FOR FORMING A LAMINATED FILM CONTAINING DIFFERENT POLYMER LAYERS

[75] Inventor: Gordon V. Sharps, Jr., Fairport, N.Y.

[73] Assignee: Mobil Oil Corporation, New York, N.Y.

[21] Appl. No.: 531,881

[22] Filed: Sep. 14, 1983

[51] Int. Cl.³ .............................................. B29C 19/00
[52] U.S. Cl. .......................... 156/244.11; 156/244.13; 156/244.14
[58] Field of Search ...................... 156/244.13, 244.14, 156/244.11

[56] References Cited

U.S. PATENT DOCUMENTS

| | | | |
|---|---|---|---|
| 3,853,661 | 12/1974 | Sudo | 156/244 |
| 3,926,706 | 12/1975 | Reifenhauser et al. | 156/244.14 |
| 3,957,566 | 5/1976 | Rahlfs | 156/244.14 |
| 4,101,050 | 7/1978 | Buckler et al. | 264/45.3 |
| 4,254,175 | 3/1981 | Kubat et al. | 156/244.11 |
| 4,357,191 | 11/1982 | Bullard et al. | 156/244.14 |

Primary Examiner—Jay H. Woo
Assistant Examiner—Timothy W. Heitbrink
Attorney, Agent, or Firm—Alexander J. McKillop; Michael G. Gilman; Charles J. Speciale

[57] ABSTRACT

Disclosed is a method and apparatus for separately coextruding dissimilar polymer melts through a die, expanding the polymer melts to different degrees and then contacting and adhering the polymer melts together at or near the frost line to produce a laminated film where the various polymer layers thereof can be optimally molecularly oriented in the completed film. The invention is particularly useful in producing a film where one of the extruded layers therein is a polymer foam.

14 Claims, 1 Drawing Figure

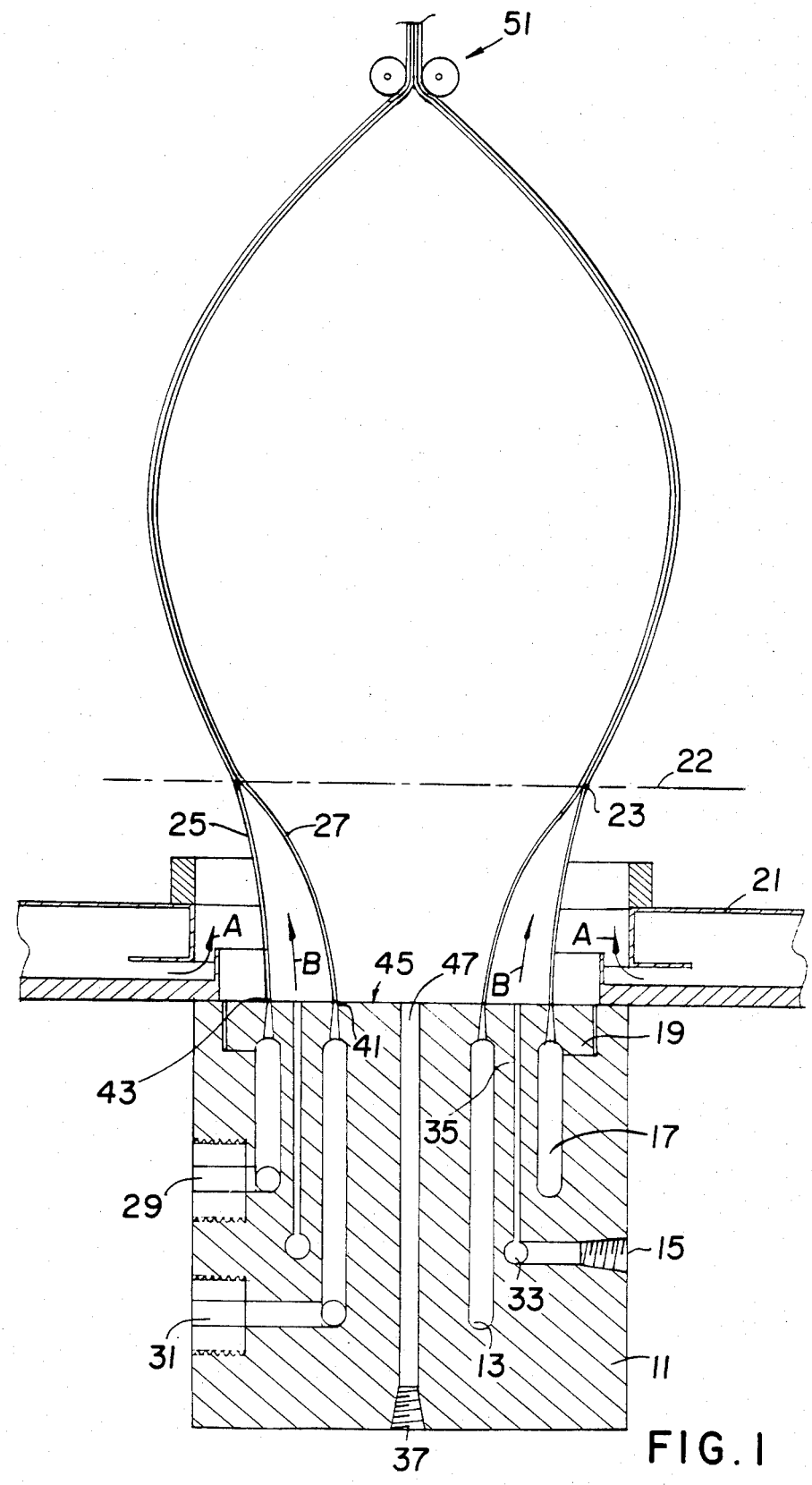
FIG. I

METHOD FOR FORMING A LAMINATED FILM CONTAINING DIFFERENT POLYMER LAYERS

BACKGROUND OF THE INVENTION

1. Field of the Invention

The present invention relates to a method and apparatus for extruding a laminated film, and particularly a tubular laminated film in which each of the polymer layers in the film is optimally molecularly oriented to impart desired structural properties to the film. More particularly, the invention relates to a method and apparatus for forming a laminated film, particularly a tubular laminated film, containing at least one properly formed foamed polymer layer and in which each of the polymer layers is optimally molecularly oriented.

2. Discussion of the Prior Art

It is often desirable to co-extrude different polymers to form a laminated film in order to impart desired strength or other physical properties to the film. Often, the extruded polymers which form layers in the laminated film have considerably different viscosities and viscoelastic behavior properties. This is true, for example, of high density and low density polyethylene. When two dissimilar polymer layers are joined within an extrusion die, the resulting extruded laminated film tends to assume the properties of the "weaker" layer so that subsequent blown expansion of the extruded film optimizes the molecular orientation properties of the weaker polymer layer, but not the other. For example, high density polyethylene typically requires a high blow-up ratio for optimal orientation, while low density polyethylene requires a lower blow-up ratio. When these two polymer materials are co-extruded, the molecular orientation imparted to both layers during blown expansion is closer to the orientation desired for the low density polyethylene and the high density polyethylene layer is not optimally oriented.

Accordingly, when polymers having different viscosities and viscoelastic behavior properties are joined and co-extruded through a tubular die, different flow path configurations, tailored to each polymer, must be provided within the die to ensure that the polymer layers in the subsequently extruded and blown laminated film will be properly molecularly oriented to achieve a desired orientation property for the film as a whole. Providing flow paths specifically tailored to a polymer is both time consuming and expensive and requires the construction of unique dies for extruding particular polymer layer combinations.

In addition, when one of the extruded polymer layers is a foamed polymer and the other is not, it is difficult to obtain a proper foaming and foam cell shape in the extruded layer because it exits the die laminated to a dissimilar polymer layer which affects the polymer foaming operation. In other words, when extruding a polymer foam layer, a particular shear rate history is required as the polymer exits the die orifice to ensure proper foaming, but this is difficult to achieve when the foamed layer is co-extruded as part of a laminated film. The co-extrusion of a foamed polymer layer with another dissimilar polymer could produce cells in the foamed layer which are excessively elongated, producing a foamed layer which easily fractures and splits.

SUMMARY OF THE INVENTION

One object of the present invention is the provision of a method and apparatus for producing a co-extruded laminated film, and particularly a tubular film, in which each of the polymer layers therein is optimally molecularly oriented during blown expansion to impart desired structural properties to the extruded film.

Another object of the invention is the provision of a method and apparatus for producing a co-extruded film, particularly a tubular film, in which one of the layers is a foamed polymer layer and wherein each of the polymer layers is optimally molecularly oriented during blown expansion to impart desired structural properties to the extruded film.

Another object of the invention is the provision of a method and apparatus for producing a co-extruded laminated film, particularly a tubular film, in which one of the layers is a properly foamed polymer layer and another layer is formed of a polymer different from the foamed polymer layer.

These and other objects and advantages of the invention are achieved by a method and apparatus, in which two or more polymer layers are extruded through, for example, a tubular die, exiting therefrom as discrete polymer tubular layers. The polymer layers are then expanded and molecularly oriented to a different degree as they exit the die. The polymer layers are then adhered together at or near the frost line to form a tubular film. The joined layers may then be further expanded and molecularly oriented in the formed film after the layers are adhered together. Preferably one of the layers in the film is a foamed polymer layer. Since the foamed layer is laminated to the other polymer layer outside the die, proper foaming, i.e., cell formation and elongation, can be assured. The method and apparatus of the invention produces an extruded film in which the different layers thereof have respective blow-up and drawdown ratios which optimize overall film properties.

The above objects, features and advantages of the invention will be more clearly recognized from the following detailed description, which is provided in connection with the accompanying drawings.

BRIEF DESCRIPTION OF THE DRAWINGS

FIG. 1 illustrates, in a schematic cross-sectional view, an extrusion method and apparatus employed in the invention.

DETAILED DESCRIPTION OF THE INVENTION

FIG. 1 schematically illustrates a die construction and extrusion method which can be used to practice the teachings of the invention.

The die construction illustrated in FIG. 1 will be described first. It includes a die body 11, in which are provided an inner annular melt channel 13, an outer annular melt channel 17, an annular gas distribution channel 33 and an annular gas flow path 35. The inner melt channel 13 receives a polymer melt from an inner layer melt inlet 31 (which receives a polymer melt from a source) and guides it to an inner annular die gap 41. The outer melt channel 17 receives a polymer melt from an outer layer melt inlet 29 (which also receives a polymer melt from a source) and guides it to an outer annular die gap 43.

The annular gas flow path 35, which provides a gas flow, as indicated by the arrows B, terminates at the end face 45 of the die containing extrusion gaps 41 and 43 at a location radially of the die axis and between extrusion gaps 41 and 43 and is connected to a gas inlet 15.

A conventional tubular film cooling air ring 21 is also provided adjacent the end face 45 of the die to surround a film layer extruded through the extrusion gaps 41 and 43. The air flow through the air ring and along the exterior surface of an extruded film is illustrated by the arrows A.

The extrusion die further includes an air inlet 37 and associated air channel 47 for feeding air for expanding an extruded tubular film to the interior of an extruded film bubble.

The die illustrated in FIG. 1 is used to co-extrude a laminated film, particularly one containing polymers having different properties, through the inner and outer extrusion die gaps 41 and 43. The respective melts from melt sources (not shown) are introduced at melt inlets 29 and 31 and are individually extruded through respective gaps 43 and 41. The extruded polymer melts 25, 27 are then individually expanded as they exit the die gaps 43 and 41 and are adhered to one another at a weld point 23 which is at or adjacent the frost line 22. Expansion of the melt layers imparts desired molecular orientation properties to them. Thereafter the tubular laminated film is further radially expanded slightly and drawn down by nip rollers 51. As is apparent from FIG. 1, the polymer melts extruded through gaps 41 and 43 are radially expanded to different degrees before they reach the weld point with the polymer melt extruded through gap 41 expanding to a greater degree than that extruded through gap 43. Accordingly, when extruding dissimilar polymer melts requiring different amounts of radial expansion for proper molecular orientation, that melt which requires a greater radial expansion for a desired molecular orientation is extruded through gap 41 while that melt requiring less expansion for a desired molecular orientation is extruded through gap 43.

The gas inlet 15, which can be used to control the pressurization of the area between layers 25 and 27 as these layers exit the die and in turn to control, together with the nip rollers 51 and extrusion rate, the radial and longitudinal expansion of the individual layers 25 and 27 as well as the laminated film above the weld point 23. Typically, the gas introduced at inlet 15 is air. The gas may be under pressure or inlet 15 may simply be opened to that atmosphere.

Using the apparatus illustrated in FIG. 1 extrusions were performed using various polymer melts on the inner and outer layers. In addition, for comparison purposes, extrusions were conducted using a conventional three-layer die, which is constructed specifically for co-extruding three polymer layers where the layers are joined in the die during extrusion. The following Table illustrates the extrusion parameters, e.g., die gaps, the polymers used, and characteristics of the laminated film which were produced.

TABLE

Physical Properties of Various Dual Lip Die Films

| Run No. | MD Gauge (mil) | MD Yield (psi) | MD Ultimate (psi) | MD Elongation (%) | MD Elmendorf (g/mil) | TD Gauge (mil) | TD Yield (psi) | TD Ultimate (psi) | TD Elongation (%) | TD Elmendorf (g/mil) | Film Type (Inner/Outer) |
|---|---|---|---|---|---|---|---|---|---|---|---|
| Dual Lip Die | | | | | | | | | | | |
| 25-83 | 1.24 | 2365 | 3643 | 561 | 42 | 1.27 | 2500 | 3400 | 681 | 227 | HD/LD |
| 81-83-A | 1.50 | 1332 | 3509 | 201 | 173 | 1.50 | 1403 | 2195 | 636 | 86 | LD/LD |
| B | .77 | 1300 | 3863 | 109 | 262 | .79 | 1410 | 11767 | 448 | 59 | None/LD |
| 82-83-1 | 1.40 | 1720 | 3946 | 219 | 173 | 1.51 | 1529 | 2588 | 667 | 94 | LD/LD Control |
| 2 | 2.42 | 962 | 1984 | 121 | 9 | 1.89 | 851 | 792 | 94 | 110 | LD/3% CBA |
| 3 | 2.10 | 1058 | 2701 | 129 | 21 | 2.10 | 925 | 852 | 81 | 64 | 3% CBA/LD |
| 4 | 1.75 | 1082 | 2498 | 287 | 28 | 1.77 | 894 | 1403 | 450 | 255 | 3% CBA/LLD |
| 99-83-1 | 1.39 | 1381 | 3391 | 350 | 85 | 1.38 | 1343 | 2814 | 675 | 259 | LD/LLD |
| 2 | 2.11 | 857 | 2074 | 363 | 44 | 2.11 | 737 | 1260 | 453 | 224 | 3% Nortech/LLD |
| 3 | 2.34 | 785 | 1907 | 379 | 43 | 2.31 | 690 | 1254 | 461 | 190 | 3% Hydrocel/LLD |
| 3-Layer Die | | | | | | | | | | | |
| 6285-82-A | 1.68 | 951 | 2023 | 310 | 57 | 1.75 | 787 | 1423 | 605 | | 3% Nortech/LLD |

Operating Conditions of Dual Lip Die

| Run No. | Die Gap Inner/Outer | BUR Inner/Outer | Gauge | Drawdown Ratio Inner/Outer | Output Inner/Outer | % Ratio Inner/Outer | *Shear Rate Inner/Outer |
|---|---|---|---|---|---|---|---|
| Dual Lip Die | | | | | | | |
| 25-83 | .040/.020 | 4.6/2.3 | 1.25 | 7.0/7.0 | 25/25 | 50/50 | 20.4/40.8 |
| 81-83 | .040/.015 | 4.6/2.3 | 1.50 | 5.8/4.3 | 15/30 | 33/66 | 12.2/87.1 |
| 82-83 | .040/.020 | 4.6/2.3 | 1.50 | 5.8/5.8 | 33/18 | 65/35 | 27/29 |
| 99-1 | .040/.020 | 3.6/1.8 | 1.40 | 7.9/7.9 | 26/20 | 57/43 | 21/33 |
| 3-Layer Die | | | | | | | |
| 6285-82 | .042/.022/.042 | 2.0 | 1.02 | 20.6/10.8/20.6 | 30/25/30 | 29/71 | 7/21/7 |

*Does not include $2\frac{(2n+1)}{n}$ term

In the above Table, 3% CBA refers to a low density polyethylene admixed with a chemical blowing agent. Likewise, 3% Nortech and 3% Hydrocel refer to low density polyethylenes admixed with commercially available Nortech and Hydrocel blowing agents. The terms LD, HD and LLD respectively refer to low density polyethylene, high density polyethylene and linear low density polyethylene. The extrusions using the apparatus of FIG. 1 produced a different degree of orientation for each polymer layer and since the layers were not in intimate contact upon leaving the die, viscosity and/or temperature differences of the melts were less significant than is normally the case. Moreover, in the case of foams, adequate time and distance were available to develop the gas cells, so that molecular orientation of the layers and the film produced little or no deformation of the foamed layer.

Materials which are normally difficult or impossible to extrude with conventional co-extrusion dies, such as HD/LD, polyethylene can be extruded with the FIG. 1 apparatus. Extruding HD/LD polyethylene film was found to be particularly advantageous as the film had a higher modulus than LD films, and because of the inner layer of HD, bags made therefrom were easy to open.

Other polymers which could be extruded are polyolefins, with high density high molecular weight materials being extruded through the inner die gap and low density materials extruded through the outer gap. Polystyrene polymer melts can also be extruded, to produce, for example, a polystyrene film/polystyrene foam laminate structure.

From empirical study, a relationship has been determined between die gap and die diameter which should be maintained so that equivalent or nearly equivalent MD (machine direction) drawdowns are experienced by both material layers. This relationships is as follows:

$$G_I/G_o = D_o/D_I \times Q_I/Q_o$$

where $G_I$ = the inner gap dimension, $Q_o$ = the outer gap output (volume per unit time), $G_o$ = the outer gap dimension, $Q_I$ = the inner gap output (volume per unit time), $D_I$ = the inner gap diameter and $D_o$ = the outer gap diameter. By using this relationship, the proper die gaps can be chosen for a particular material ratio.

In summary, when dissimilar polymer melts are extruded through a conventional coextrusion die, molecular orientation properties in the final film are generally dictated by the "weaker" polymer since the polymer melt streams join within the die and the coextruded film is blown into final form with the same blow-up ratio (BUR) and drawdown, without optimizing the molecular orientation properties for each of the melt layers. By extruding dissimilar polymer melts separately, each can have a different BUR to optimize molecular orientation. For example, LDPE (low density polyethylene) is typically extruded with a 2.2–2.7 BUR, while HDPE (high density polyethylene) is typically extruded with a 2.8–3.8 BUR, and polystyrene is typically extruded with a 4.5–5.0 BUR. With the method and apparatus of the invention, the molecular orientation of each polymer layer can be optimized, thereby improving overall film properties. Since the film layers do not contact until a point some distance above the die, this also allows viscous effects and drawdown problems to be damped by the post die non-contact zone. For this reason, superior polyethylene foam/film can be made using the FIG. 1 apparatus than can be made by convention coextrusion, where the polymer layers are joined within the die. In previous attempts, the higher drawdown in the film cause severe cell elongation and often cell rupture of the foamed layer, degrading physical properties.

A laminated film produced using the method and apparatus of the invention can be formed, using conventional techniques, into bags, e.g., household trash bags. Particularly good bag strength and other physical properties can be achieved when one of the laminated film layers is a polyethylene foamed layer and the other is a polyethylene film layer, or when one layer is a high density polyethylene and the other is a low density polyethylene. Bags can also be made out of a laminated film produced by the other polymer melt combinations listed in the Table above, as well as from a polystyrene foam/film combination.

While a preferred embodiment of the method and apparatus of the invention has been described and illustrated, it should be apparent that many modifications can be made to the invention without departing from its spirit or scope. For example, although an apparatus for extruding a two layer film has been illustrated, three or more layer films could also be produced using the invention. Also, although several polymer materials have been discussed as being particularly suitable for use in the invention, many other polymers may also be used. Accordingly, the invention is not limited by the foregoing description, but is only limited by the scope of the claims appended hereto.

I claim:

1. A method for coextruding a laminated film containing at least two dissimilar polymer layers comprising the steps of:
    providing a die having at least first and second flow paths through which at least two polymer melts can be extruded as individual polymer layers, said flow paths terminating at respective die gaps;
    feeding a non-foamed polymer melt through a first flow path of said die;
    feeding a foamed polymer melt through a second flow path of said die;
    drawing said non-foamed and said foamed polymer melts away from said die as separate non-contacting layers, while expanding them to different degrees; and,
    contacting said non-foamed and said foamed polymer melt layers so they adhere together to form a film at a weld point spaced from said die which is at or near a frost line of said polymer melts.

2. The method of claim 1, further comprising the step of further expanding said film after said non-foamed and said foamed polymer melt layers are contacted and adhered together.

3. The method of claim 1, wherein said die is a tubular die and said flow paths and die gaps are of annular shape and one of said die gaps is an inner die gap and the other of said die gaps is an outer die gap.

4. The method of claim 3, wherein said die gaps have a diameter, and the relationship between said die gaps and die diameter is:

$$G_I/G_o = D_o/D_I \times Q_I/Q_o$$

where $G_I$ = the inner die gap dimension, $G_o$ = the outer die gap dimension, $Q_o$ = the outer die gap output, $Q_I$ = the inner die gap output, $D_I$ = the inner die gap diameter and $D_o$ = the outer die gap diameter.

5. The method of claim 1, wherein said non-foamed polymer melt is a non-foamed polystyrene and said foamed polymer melt is a foamed polystyrene.

6. The method of claim 1, further comprising the step of introducing a gas between said non-foamed and said foamed polymer melts as they are drawn from said die.

7. The method of claim 1 wherein said non-foamed polymer melt is a non-foamed polyethylene and said foamed polymer is a foamed polyethylene.

8. The method of claim 7 wherein said non-foamed polymer melt is a linear low density polyethylene.

9. The method of claim 7 wherein said non-foamed polymer melt is a low density polyethylene.

10. A method for coextruding a laminated film containing at least two dissimilar polymer layers comprising the steps of:
    providing a die having at least first and second flow paths through which at least two polymer melts can be extruded as individual polymer layers, said flow paths terminating at respective die gaps;
    feeding a low density polyethylene melt through a first flow path of said die;

feeding a linear low density polyethylene melt through a second flow path of said die;

drawing said low density polyethylene and said linear low density polyethylene melts away from said die as separate non-contacting layers, while expanding them to different degrees; and, contacting said first and second melt layers so they adhere together to form a film at a weld point spaced from said die which is at or near a frost line of said melts.

11. The method of claim 10, further comprising the step of further expanding said film after said low density polyethylene and said linear low density polyethylene polymer melt layers are contacted and adhered together.

12. The method of claim 10, wherein said die is a tubular die and said flow paths and die gaps are a annular shape and one of said die gaps is an inner die gap and the other of said die gaps is an outer die gap.

13. The method of claim 10, wherein said die gaps have a diameter, and a relationship between said die gaps and die diameter is:

$$G_I/G_o = D_o/D_I \times Q_I/Q_o$$

where $G_I$ = the inner die gap dimension, $G_o$ = the outer die gap dimension, $Q_o$ = the outer die gap output, $Q_I$ = the inner die gap output, $D_I$ = the inner die gap diameter and $D_o$ = the outer die gap diameter.

14. The method of claim 10, further comprising the step of introducing a gas between said low density polyethylene and said linear low density polyethylene polymer melt layers as they are drawn from said die.

* * * * *